W. A. TURBAYNE.
REGULATOR FOR ELECTRIC GENERATORS.
APPLICATION FILED APR. 22, 1914. RENEWED MAY 31, 1919.
1,331,223. Patented Feb. 17, 1920.
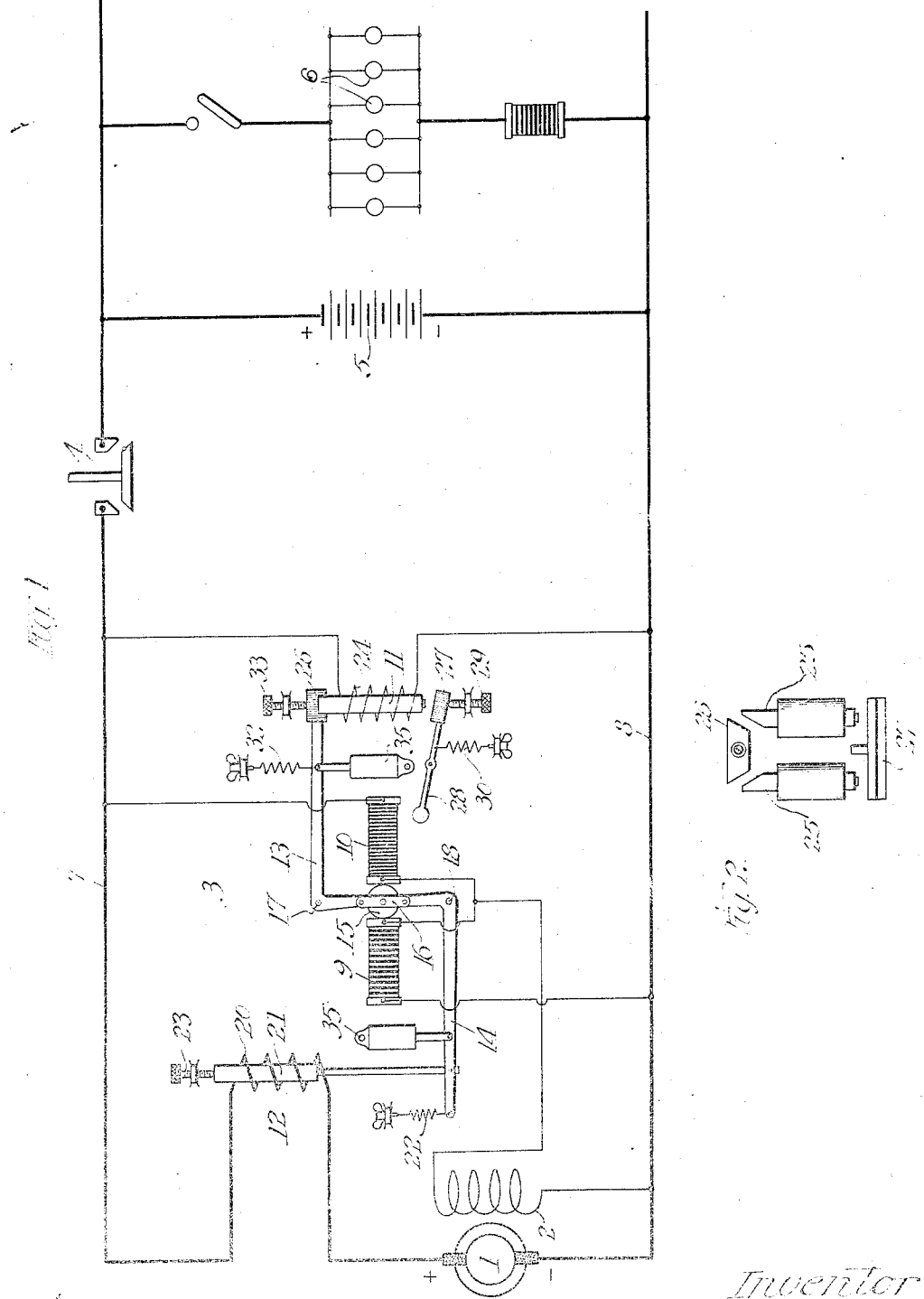

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

REGULATOR FOR ELECTRIC GENERATORS.

1,331,223.     Specification of Letters Patent.     Patented Feb. 17, 1920.

Application filed April 22, 1914, Serial No. 833,623. Renewed May 31, 1919. Serial No. 301,124.

*To all whom it may concern:*

Be it known that I, WILLIAM A. TURBAYNE, a citizen of the United States, residing at Niagara Falls, in the county of Niagara and State of New York, have invented new and useful Improvements in Regulators for Electric Generators, of which the following is a full, clear, concise, and exact description, reference being had to the accompanying drawing, forming a part of this specification.

This invention relates to regulators for electric generators.

The invention is especially applicable to the regulation of variable speed battery charging generators, such as are employed in railway car lighting and automobile starting and lighting systems. However, the invention is not limited to such application and may be employed in other relations and under other conditions.

One object of this invention is to provide an improved and efficient regulator which will permit a maximum current out-put at relatively low speeds and will prevent excessive output at higher speeds and which is capable of accurate adjustment.

Another object is to provide a regulator having improved and simplified mechanical and electrical structure.

A still further object is to provide a regulator of maximum sensitiveness.

My investigation of the conditions obtaining in a system of the kind above mentioned reveals a number of conflicting conditions which must be met in producing a regulator which will secure to a maximum degree the qualities of efficiency, sensitiveness and reliability.

In regulating the voltage of the battery charging generator it is necessary to regulate independently two things, namely, terminal voltage and current output. This is because of the peculiar qualities of a storage battery as a load. When the charge in the battery is considerably depleted the voltage of the battery will be quite low. If now the battery is connected to the generator for charging it is necessary to guard against too great a current flow because of the low counter-electro-motive force. Current regulation is desirable to guard against this. As the charge of the battery nears completion the voltage may rise quite sharply and if current regulation were allowed to control, the result would be a rise of generator voltage and a useless and possibly harmful overcharge of the battery. To prevent this it is desirable to institute voltage control. These controls, namely, the current control and the voltage control should not be permitted to operate before they are needed, otherwise they will interfere with prompt building up of the generator voltage as the armature accelerates. The internal resistance of the storage battery is very low, so low in fact that a very slight change in voltage of the generator will produce a great change in the quantity of current flowing after the voltage of the generator has once attained the terminal voltage of the battery.

This invention meets to a nicety the above and other conflicting conditions and secures a number of marked advantages.

One embodiment of the invention is illustrated in the accompanying drawings in which:—

Figure 1 is a diagram of a system embodying the invention.

Fig. 2 is a fragmentary detail showing the cores and armatures of the voltage controlled regulating magnet.

The system shown in Fig. 1 comprises a generator having an armature 1 and a shunt winding 2, a regulator 3 for the shunt field winding, an automatic switch 4, a storage battery 5 and a bank of lamps 6 connected to the generator by the mains 7 and 8. The regulator 3 comprises carbon pile rheostats 9 and 10 in shunt of the field winding and in series with the field winding respectively. These rheostats are controlled by regulating electromagnets 11 and 12 through bell crank levers 13 and 14. The two rheostats 9 and 10 are placed substantially in line end to end and between them a roller 15 is provided to change the pressure on these rheostats. The roller 15 is mounted on a link 16 which is connected at each end to one of the bell crank levers 13 and 14 which levers are pivoted at points 17 and 18 respectively. The electromagnetic means 12 comprise a solenoid having a series winding 20 and a core 21, for exercising a control over the rheostats in accordance with the current output of the generator. A spring 22 is placed normally under tension and holds the bell crank lever 14 in a raised position to exert an initial pressure on the rheostat 10. A stop 23 is provided for adjusting the initial position of the lever 14 and for taking up part of the tension of the spring 22 so that a certain force of attraction in the solenoids will be required to overcome the tension of the spring before any regulating action takes place. This is to prevent any values of current less than a predetermined amount from operating the rheostat. If smaller values of current were allowed to operate the solenoid, the regulator would begin its action before the same were really needed. When the solenoid 12 overcomes the tension of the spring 22 it will move the lever 14 downward and the short end of the bell crank lever will swing the link 16 about its upper end which is pivoted on the bell crank lever 13 and will move the roller to release the pressure on the rheostat 10 and increase the pressure on the shunting rheostat 9. The bell crank lever 13 which is also capable of exerting a control over the rheostats is arranged to be subject to the influence of the electromagnet 11. This electromagnet has a shunt winding 24 wound around two parallel cores 25. Two separate armatures 26 and 27 are provided at opposite ends of the cores. The magnetic circuit of this magnet has a very large reluctance due to the air gaps between the cores and their armatures. The reluctance is made so high that the cores are unable to attract the armature 26 until the reluctance has been decreased. This is accomplished by the action of the armature 27 which is mounted on a statically balanced lever 28 and held against a stop 29 by a spring 30, the tension of which may be adjusted. The tension of the spring 30 is so adjusted that the armature 27 will be attracted to the cores at a definite value of the voltage across the mains 7 and 8. The armature 27 thus serves as sensitizing or prompting means to render the magnet sensitive for regulation at and above a certain value of voltage across the mains 7 and 8. The voltage at which this occurs is preferably the voltage of the battery when the charge is at or near completion. The armature 26 is wedge-shaped and the cores 25 are cut so as to present faces parallel to the sides of the armature, thereby allowing a greater relative movement without so sharp an increase in the attractive force of the magnet. The armature 26 is mounted on the bell crank lever 13, which is normally held in a position of rest by a spring 32 which holds the lever against a stop 33. By thus holding the lever 13 stationary the link 16 is allowed to pivot about the end of the lever as if the same were a fixed abutment. Similarly, the action of the spring 22 and the abutment 23 may hold the lever 14 in fixed position so that the link 16 may be swung around its lower end as a pivot when the lever 13 is moved.

The operation of the system is as follows;—when the armature 1 of the generator begins to rotate the terminal voltage is built up as the speed increases. The field current flowing through the rheostat 10 and winding 2 is insufficient to cause the solenoid 12 to overcome the tension of the spring 22 and no interference by the regulator is caused. When the proper voltage has been attained for charging the battery, the automatic switch 4 will be closed and current will be supplied to the battery 5 and to the lamps 6. The solenoid 12 should operate to produce regulation only when the maximum desired current is flowing and the spring 22 and the stop 23 are so adjusted that said maximum current will be just sufficient to disengage the core 21 from the stop 23 and to allow the solenoid to exercise a control over the rheostats 9 and 10. Any tendency to send more than the predetermined current operates to move the lever 14 downward and thereby swing the link 16 about its upper end as a pivot to relax the pressure on the carbon pile 10 and to increase the pressure on the rheostat 9. This lowers the field current strength and thus reduces the voltage to the proper value.

When the battery has received a full charge its voltage will be considerably raised. The counter-electromotive force will tend to cut down the current and the voltage across the mains 7 and 8 will tend to rise as the regulating solenoid will attempt to retain constant current flowing in the mains. The electromagnet 11 is so adjusted that when the voltage of the system reaches a desired maximum the armature 27 will be attracted to the cores 25 and the reluctance of the magnetic circuit is thereby so much decreased that the armature 26 will be influenced by the current flowing through the winding 24. The tension in the spring 32 attached to the arm 13 may be so adjusted that the armature 26 will not be moved until a predetermined voltage is reached and the adjustment may be such that the battery 5 will thereafter be floated across the line producing what is known as a "stop charge" effect, or the adjustment may be made such that a very slight current will continue to flow through the battery. As soon as the magnet 11 begins to regulate the rheostats, current will drop off rapidly and as a consequence the pull of the solenoid 12 on its core 21 is insufficient to overcome the tension of the spring 22 and this spring holds the lever 14 stationary by coöperation with the fixed stop 23. The regulation of the carbon piles 9 and 10 is thereafter effected solely by the voltage controlled means 11. If the voltage of the armature 1 dies down the regulating magnet 11 will become ineffective also. The automatic switch 4 opens and the system is disconnected. Upon again starting the armature 1 and bringing it up to speed the same cycle of operation will be performed.

By the structure above described I am enabled to produce a very close regulation of the generator voltage. The solenoid 12 is not capable of as close adjustment as to the value at which it will operate as is the electromagnet 11 but it will be noticed that not so fine an adjustment of this magnet is required inasmuch as a slight variation in current is permissible. It merely affects the amount of the charge going through the battery. Hence, a current responsive solenoid may be used. This type of apparatus can be constructed cheaply and can be constructed to have a considerable pull with a few turns of the series conductor. The electromagnet 11 on the contrary is capable of very close regulation and of careful adjustment. This should necessarily be so because of the effect which slight variations in voltage have upon the charging current of the battery as well as upon the lamps 6 which may be connected to the system. The characteristic of the electromagnet 11 is such as to produce a very marked increase of the force of attraction as the armature 26 approaches the cores 25. This produces a very sharp action of the electromagnet and prevents any danger of what might be termed inertia in regulation, *i. e.*, the lag of the regulating effect behind the voltage. The type of regulating rheostat that I have used is such as to produce a quick change in the current flowing in the field 2 of the generator. The effects of the two resistances are cumulative as an increase in resistance 10 tends to cut down the current flowing through the winding 2 and a decrease of the resistance 9 tends to partially short-circuit the winding 2. It will be seen that I have produced a regulator of simple construction and of great sensitiveness and efficiency.

While the invention has been described with reference to the particular details of the embodiment illustrated it is not desired to limit the invention in any manner to any of the details described nor to any particular mechanism as the invention is capable of being embodied in various forms and is capable of various modifications all of which come within the spirit of the invention.

What I claim as new and desire to secure by Letters Patent of the United States is:

1. In a system containing a generator having a field winding, a variable resistance governing the current in said field winding, a movable link pivoted at both ends for varying said resistance, a magnet having an armature connected to said link, said magnet being of insufficient power to move said armature and means to increase the power of said magnet.

2. In a system containing a generator having a field winding, a variable resistance governing the current in said field winding, a movable link pivoted at both ends for varying said resistance, a magnet for moving said link, said magnet having a winding but being normally insensitive to current through said winding and means to render said magnet sensitive.

3. In a system containing a generator, a field winding, a variable resistance governing the current in said field winding, a movable link for varying said resistance, a magnet for moving said link, said magnet having a winding but being normally insensitive to current through said winding and means operated by a current of predetermined value through said winding to render said magnet sensitive to current in said winding to control said link.

4. In a system containing a generator having a field winding, a variable resistance governing the current in said field winding, a movable link for varying said resistance, a magnet for moving the link, a winding for said magnet carrying current, said magnet having a large magnetic reluctance preventing the magnet from moving said link and means to reduce said reluctance so that said current will cause the magnet to move the link.

5. In a system containing a variable speed generator having a field winding, a variable resistance governing the current in said field winding, a movable link for varying said resistance, a magnet for moving said link, a winding for said magnet carrying current, said magnet having a large magnetic reluctance preventing the magnet from moving said link and means operated by a current of predetermined value in said winding for reducing said reluctance to allow the magnet to move said link.

6. In a system containing a variable speed generator having a field winding, a variable resistance governing the current in said field winding, a movable link for varying said resistance, a magnet having a large reluctance, two armatures for said magnet, a lever, one of said armatures connected to said link by said lever, and a statically balanced lever, said second armature being mounted on said latter lever and adapted to reduce the reluctance of said magnet when the armature is attracted to the magnet.

7. In a system containing a variable speed generator having a field winding, a variable resistance in shunt of said field winding, a variable resistance in series with said field winding, a link for varying said resistances, a magnet having a large reluctance, two armatures for said magnet, a lever, one of said armatures being connected to said link by said lever, and a statically balanced lever, said second armature being mounted on said latter lever and adapted to reduce the reluctance of the magnet when it is attracted to the magnet.

8. In a system containing a generator having a field winding, a variable resistance governing the field winding, a movable link for varying said resistance, two levers connected to said link, one to each end thereof, a current controlled solenoid governing one of said levers and a voltage controlled electromagnet governing the other of said levers, one of said solenoids having a sensitizing means operated by the solenoid for restraining operation of its lever until a predetermined current value in the solenoid is reached, and permitting operation of said lever after said current value is attained.

9. In a system containing a generator having a field winding, a variable resistance for controlling said field winding, current controlled means governing said variable resistance, said current controlled means being unresponsive to current less than a predetermined value, a second variable resistance also controlling said field winding, voltage controlled means controlling said second variable resistance, said voltage controlled means being provided with means for varying the standard of values at which said voltage controlled means will operate.

10. In a system containing a variable speed generator having a field winding, a variable resistance governing the current in said field winding, a movable link for varying said resistance, levers connected to said link, one to each end thereof, a current controlled solenoid governing one of said levers, a voltage controlled electromagnet governing the other of said levers, said electromagnet being normally insensitive for regulation to current flow through its winding and means to render said electromagnet sensitive for regulation.

11. In a car-lighting system having a generator provided with a shunt field winding, means for regulating said generator including a variable resistance for controlling said field winding, current responsive means for controlling said resistance and voltage responsive means also adapted to control said resistance, said voltage responsive means being normally unresponsive to voltage less than a predetermined value and said voltage responsive means having incorporated therein means for sensitizing said voltage responsive means to cause the same to respond to a predetermined lower voltage.

12. In a car-lighting system having a generator provided with a shunt field winding, means for regulating said generator including a variable resistance for controlling said field winding, current responsive means and voltage responsive means for controlling said resistance, one of said means being normally unresponsive to operating influences of less than a predetermined value and said last mentioned means having incorporated therein means for sensitizing the same to cause it to respond to an operating influence of predetermined lower value.

13. In a system containing a generator having a field winding, a variable resistance in series with said field winding, a second variable resistance in shunt to said field winding, operating means common to both resistances, said operating means including a current responsive means and a second operating means, said second operating means being normally unresponsive to operating influences and having incorporated therein sensitizing means for rendering said operating means responsive to operating influences of a predetermined value.

14. In a system including a generator having a field winding, a variable resistance for controlling said field winding, a plurality of independent operating means for said resistance, one of said operating means being normally unresponsive to operating influences and having incorporated therein sensitizing means for rendering said operating means responsive to operating influences of a predetermined value.

15. In a system including a generator having a field winding, a variable resistance for controlling said field winding, a plurality of independent operating means for said resistance, one of said operating means being voltage responsive and being normally unresponsive to normal voltages on the system, said means having incorporated therein sensitizing means for rendering the same responsive to normal voltages on the system.

16. In a system including a generator provided with a field winding, a variable resistance for controlling said field winding, a plurality of independent operating means for said resistance, one of said operating means being voltage responsive and being normally unresponsive to normal voltages on the system, said voltage responsive means having incorporated therein a voltage responsive sensitizing means adapted to operate at a predetermined voltage on the system to render said first operating means responsive to normal voltages on the system.

In witness whereof, I have hereunto subscribed my name in the presence of two witnesses.

WILLIAM A. TURBAYNE.

Witnesses:
W. E. HEIST,
J. E. CANNON.